US009152795B2

(12) United States Patent
Laverdière-Papineau

(10) Patent No.: US 9,152,795 B2
(45) Date of Patent: Oct. 6, 2015

(54) SECURITY VULNERABILITY CORRECTION

(75) Inventor: Marc-André Laverdière-Papineau, Hyderabad (CA)

(73) Assignee: Tata Consultancy Services Limited (IN)

( * ) Notice: Subject to any disclaimer, the term of this patent is extended or adjusted under 35 U.S.C. 154(b) by 14 days.

(21) Appl. No.: 13/328,476

(22) Filed: Dec. 16, 2011

(65) Prior Publication Data

US 2013/0086689 A1     Apr. 4, 2013

(30) Foreign Application Priority Data

Sep. 30, 2011   (IN) .......................... 2775/MUM/2011

(51) Int. Cl.
| | |
|---|---|
| G06F 7/04 | (2006.01) |
| G06F 15/16 | (2006.01) |
| G06F 17/30 | (2006.01) |
| H04L 29/06 | (2006.01) |
| G06F 21/57 | (2013.01) |
| G06F 21/54 | (2013.01) |

(52) U.S. Cl.
CPC .............. *G06F 21/577* (2013.01); *G06F 21/54* (2013.01)

(58) Field of Classification Search
CPC ..... G06F 21/577; G06F 21/536; G06F 21/60; G06F 11/3604; G06F 11/3668; G06F 11/362; G06F 11/7664; G06F 8/10; G06F 8/20; G06F 8/30; G06F 8/60; G06F 8/70; H04L 63/1433
USPC ................................................ 726/4, 22–27
See application file for complete search history.

(56) References Cited

U.S. PATENT DOCUMENTS

| | | | |
|---|---|---|---|
| 8,527,814 B1* | 9/2013 | Elwell et al. ................. | 714/38.1 |
| 2003/0212909 A1* | 11/2003 | Chandrashekhar et al. .. | 713/201 |
| 2005/0246776 A1* | 11/2005 | Chawro et al. .................. | 726/23 |
| 2005/0257268 A1* | 11/2005 | Guo et al. ......................... | 726/25 |
| 2006/0156286 A1* | 7/2006 | Morgan et al. ................ | 717/124 |
| 2006/0282897 A1* | 12/2006 | Sima et al. ...................... | 726/25 |
| 2007/0261124 A1* | 11/2007 | Centonze et al. ............... | 726/27 |
| 2008/0083031 A1* | 4/2008 | Meijer et al. .................... | 726/22 |
| 2008/0115218 A1* | 5/2008 | Jeffries et al. ................... | 726/25 |
| 2008/0178287 A1* | 7/2008 | Akulavenkatavara et al. | 726/22 |
| 2010/0058291 A1* | 3/2010 | Hahn et al. .................... | 717/113 |
| 2010/0095348 A1* | 4/2010 | Foster et al. ...................... | 726/1 |
| 2011/0219447 A1* | 9/2011 | Horovitz et al. ................ | 726/22 |
| 2011/0231936 A1* | 9/2011 | Williams et al. ................ | 726/25 |
| 2011/0302566 A1* | 12/2011 | Abadi et al. ................... | 717/168 |
| 2012/0017280 A1* | 1/2012 | Wiegenstein et al. .......... | 726/25 |
| 2012/0110671 A1* | 5/2012 | Beresnevichiene et al. .... | 726/25 |
| 2012/0204143 A1* | 8/2012 | Fox et al. ....................... | 717/113 |
| 2012/0317645 A1* | 12/2012 | Fortier ............................ | 726/24 |

* cited by examiner

*Primary Examiner* — Thuong Nguyen
(74) *Attorney, Agent, or Firm* — Schwegman Lundberg & Woessner, P.A.

(57) ABSTRACT

Systems and methods for addressing security vulnerability in a program code are described. The method comprises detecting a security vulnerability. The method further comprises identifying a set of security solutions specified within a specification repository, wherein each security solution is associated with the detected security vulnerability. The method further comprises presenting the set of security solutions to a user for selection. The method further comprises transforming a program code portion associated with the detected security vulnerability in conformance with a security solution selected by the user from the set of security solutions.

13 Claims, 2 Drawing Sheets

SECURITY VULNERABILITY CORRECTION

CLAIM OF PRIORITY

This application claims the benefit of priority under 35 U.S.C. §119 of Marc-André Laverdiére-Papineau, Indian Patent Application Serial Number 2775/MUM/2011, entitled "SECURITY VULNERABILITY CORRECTION," filed on Sep. 30, 2011, the benefit of priority of which is claimed hereby, and which is incorporated by reference herein in its entirety.

TECHNICAL FIELD

The present subject matter described herein, in general, relates to vulnerabilities in a program code and, in particular, relates to systems and methods for enabling security vulnerability correction in the program code.

BACKGROUND

Web based software applications are increasingly being used by several organizations and individuals. Such web based software applications serve for implementing a variety of functionality and have become ubiquitous in their use for all web-based applications.

A large number of such web based software applications deal with confidential information. Hence it becomes increasingly important that the web based software applications that are created are secure. Despite best efforts of programmers, a program code written by the programmers may still be susceptible to security vulnerabilities. These security vulnerabilities may arise as the programmers themselves may not be experienced in secure programming or that the security vulnerability may be such that it has surfaced only recently. As a result, these web based software applications may be prone to security vulnerabilities which may inadvertently jeopardize the confidential information.

SUMMARY

This summary is provided to introduce concepts related to systems and methods for security vulnerability correction and the concepts are further described below in the detailed description. This summary is not intended to identify essential features of the claimed subject matter nor is it intended for use in determining or limiting the scope of the claimed subject matter.

In one implementation, a method for addressing security vulnerability in a program code is described. The method comprises detecting a security vulnerability. The method further comprises identifying a set of security solutions specified within a specification repository, wherein each security solution is associated with the detected security vulnerability. The method further comprises presenting the set of security solutions to a user for selection. The method further comprises transforming a program code portion associated with the detected security vulnerability in conformance with a security solution selected by the user from the set of security solutions.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
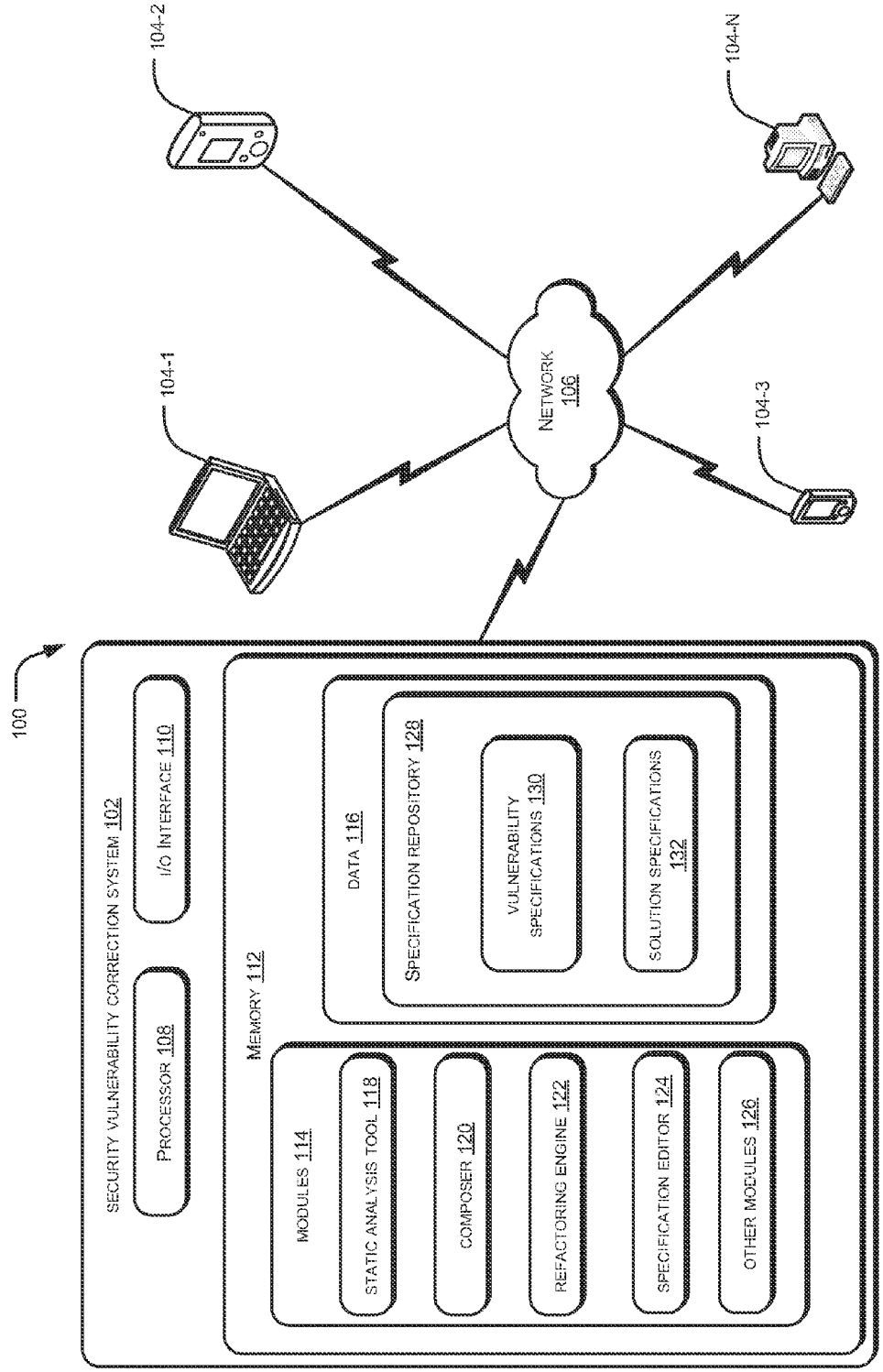
FIG. 1 illustrates a network implementation 100 of a Security Vulnerability Correction System (SVCS), in accordance with an implementation of the present subject matter.

Systems and methods for security vulnerability correction are described herein. The system and the method can be implemented in a variety of computing systems. The computing systems that can implement the described method include, but are not restricted to, mainframe computers, workstations, personal computers, desktop computers, minicomputers, servers, multiprocessor systems, laptops, mobile computing devices, and the like.

The present subject matter in general relates to addressing security vulnerabilities in a program code or a source code. A large number of applications, particularly web-based applications, being developed may involve handling sensitive or confidential data. As a result, the applications being developed have to be secure. Security vulnerabilities may arise during the programming stage where certain programming constructs may be susceptible to security vulnerabilities.

If left undetected, such security vulnerabilities may result in compromising the security and sensitivity of confidential information that may get exchanged when such applications are put to use. For example, a web-based banking application, if left unsecured, can result in large monetary losses to individuals. It is therefore essential that such applications are secure. Typically, security vulnerabilities can be handled during the programming stage, i.e., when the program code or the source code is being written. While programming, a programmer may follow certain programming constructs that are known to be more secure in comparison with other known or available options.

There are various conventional systems that scan the program code for detecting security vulnerabilities. Such conventional systems determine the security vulnerabilities within the program code based on static analysis, i.e., when the program code is not being executed. In such cases, the program code within a developer environment, such as an Integrated Development Environment (IDE), can be scanned transparently while the program code is being edited to detect known security vulnerabilities that may be present in the source code. The security vulnerabilities can be detected based on predefined vulnerability specifications that may specify one or more such security vulnerabilities. The security vulnerabilities once detected can be reported to the programmer for corrective action. The program code portion can then be modified by the programmer so as to overcome the detected security vulnerabilities. Such conventional systems, however, may provide false reports or false negatives, and may not fully address all security vulnerabilities in the program code. Such systems may also not be capable of detecting vulnerabilities that are otherwise unknown or not included within the vulnerability specifications.

Therefore, systems and methods for security vulnerability correction are described in accordance with present subject matter. In one implementation, the program code for which security vulnerability correction is to be performed is scanned for detecting one or more security vulnerabilities within the program code. Once the security vulnerabilities are detected, one or more associated security solutions are determined. In one implementation, the security vulnerabilities are associated with one or more security solutions. The security solutions so determined are proposed to the user, say a programmer. Depending on a programming requirement, the user may select one of the proposed security solutions. Depending on the selected solution, a program code portion, for which a security vulnerability was detected, is transformed in conformance with the proposed selected solution.

In one implementation, the security vulnerabilities and the security solutions can be included within vulnerability specifications and solution specifications, respectively. A special-purpose specification language may be used for expressing the vulnerability specifications and solution specifications.

It may be understood that in one example, when a security vulnerability is detected in the program code, there may exist no corresponding security solutions in the specification repository described later. For such unknown security vulnerability, the user may modify the vulnerability specifications to add and associate a new vulnerability specification for the detected security vulnerability.

In this way, several users may contribute to create the vulnerability specifications and the solution specifications. The vulnerability specifications and the solution specifications may be saved in a specification repository which may be coupled to IDEs of the users. The specification repository may be used to remediate upcoming security vulnerabilities. Advantageously, the specification repository may evolve and keep updated as more and more users contribute to the development of the specification repository.

These and other aspects of the present subject matter would be described in greater detail in conjunction with the following figures. While aspects of described systems and methods for security vulnerability correction may be implemented in any number of different computing systems, environments, and/or configurations, the embodiments are described in the context of the following system.

FIG. 1 illustrates a network 100 implementing a Security Vulnerability Correction System (SVCS) 102 for remediating security vulnerabilities in a program code, in accordance with an embodiment of the present subject matter. In one embodiment, the SVCS 102 may be configured to remove security vulnerabilities from the program code. The SVCS 102 may be implemented in a variety of computing systems such as a laptop computer, a desktop computer, a notebook, a workstation, a mainframe computer, a server, a network server, and the like. It will be understood that the SVCS 102 may be accessed through one or more client devices 104 or applications such as an IDE residing on client devices 104. Examples of the client devices 104 may include, but are not limited to, a portable computer 104-1, a personal digital assistant 104-2, a handheld device 104-3, and a workstation 104-N. The client devices 104 are communicatively coupled to the SVCS 102 through a network 106 for facilitating one or more users.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the SVCS 102 may include at least one processor 108, an interface 110, and a memory 112. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions stored in the memory 112.

The I/O interface 110 may include a variety of software and hardware interfaces, for example, a web interface, a graphical user interface, an the like. The I/O interface 110 may allow the SVCS 102 to interact with the client devices 104. Further, the I/O interface 110 may enable the SVCS 102 to communicate with other computing devices, such as web servers and external data servers (not shown). The I/O interface 110 can facilitate multiple communications within a wide variety of networks and protocol types, including wired networks, for example LAN, cable, etc., and wireless networks such as WLAN, cellular, or satellite. The I/O interface 110 may include one or more ports for connecting a number of devices to one another or to another server.

The memory 112 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 112 may include modules 114 and data 116.

The modules 114 include routines, programs, objects, components, data structures, etc., which perform particular tasks or implement particular abstract data types. In one implementation, the modules 114 may include a static analysis tool 118, a composer 120, a refactoring engine 122, a specification editor 124, and other modules 126. The other modules 126 may include programs or coded instructions that supplement applications and functions of the SVCS 102. In one implementation, other modules 126 may include one or more modules for implementing an Integrated Development Environment (IDE) within the SVCS 102. The IDE may be used by a user to develop the program code. The IDE may either be a web based IDE or a locally installed IDE. The IDE may be used to develop program code in any programming language such as Java, C++, ASP.NET, C#, Python, and the like.

The data 116, amongst other things, serves as a repository for storing data processed, received, and generated by one or more of the modules 114. The data 116 may also include a Specification Repository (SR) 128. The SR 128 may include vulnerability specifications 130 and solution specifications 132. The vulnerability specifications 130 include information related to one or more security vulnerabilities and a list of abstract solutions providing hints for solving the security vulnerabilities. The solution specifications 132, on the other hand, include one or more security solutions that are associated with the one or more security vulnerabilities specified in the vulnerability specifications 130. For example, the vulnerability specifications 130 may include information describing security vulnerabilities such as injection flaws, including SQL injection, cross-site scripting, cross-site request forgery, and so on. As will be appreciated by a person skilled in the art, the present subject matter should not be taken to be applicable for only the above such security vulnerabilities. The above indicated vulnerabilities are only illustrative and should not be used for limiting the scope of the present subject matter.

In one implementation, while the user is developing the program code in the IDE, the IDE may scan the program code for security vulnerabilities either transparently or upon a user's request. In one example, the user may use the static analysis tool 118 in order to scan the program code for security vulnerabilities. The static analysis tool 118 may reside within or outside the IDE. Further, the static analysis tool 118 may use techniques such as Binary Decision Diagram, Program Slicing, and other techniques known in the art in order to scan the program code for security vulnerabilities within the IDE. The static analysis tool 118 detects one or more security vulnerabilities in the program code. The security vulnerabilities that are detected may be known, i.e., included in the vulnerability specifications 130 as specified in the SR 128 or can be unknown. The vulnerability specifications 130 may provide details and information pertaining to the security vulnerabilities. For example, a vulnerability specification for a cross-site scripting (XSS) vulnerability may elaborate that XSS vulnerability may occur whenever an application takes un-trusted data and sends the un-trusted data to a web browser without proper validation and escaping. The vulnerability specification for the XSS vulnerability may further explain that XSS vulnerability allows attackers to execute scripts in a victim's browser, wherein the attackers can hijack user sessions, deface web sites, redirect the user to malicious sites, and perform other malicious acts. In one implementation, the static analysis tool 118 may detect the security vulnerabilities by scanning through the program code. In such a case, the static analysis tool 118 may extract parts of the program code, as slices, based on a technique conventionally referred to as program slicing.

Once the static analysis tool 118 has detected security vulnerability in the program code, the IDE may use a vulnerability parser (not shown) to present the detected security vulnerability to the user. Once one or more security vulnerabilities are detected and presented to the user, the composer 120 may determine at least one set of security solutions. The set of security solutions may be one or more programming constructs that can be utilized for fixing the detected security vulnerability. In one implementation, the set of security solutions may provide some or all implementations of the list of abstract solutions mentioned in a vulnerability specification corresponding to the detected security vulnerability. In the present implementation, the composer 120 may first determine from the vulnerability specifications 130, a vulnerability specification corresponding to the detected security vulnerability. Subsequently, the composer may find a solution specification matching the vulnerability specification. The solution specification may include the set of security solutions capable of fixing the detected security vulnerability.

Once the set of security solutions from the solution specifications 132 are determined, the IDE may provide the set of security solutions to the user. The set of security solutions may be already available in the solution specifications 132 included in the SR 128. In one implementation, after the set of security solutions is presented to the user, the user may select a security solution from the set of security solutions.

In this embodiment, after the security solution is selected by the user, the refactoring engine 122 may transform a program code portion associated with the detected security vulnerability in order to remove the detected security vulnerability. In one implementation, the refactoring engine 122 transforms the program code portion with the detected security vulnerability based on one or more transformation rules. More specifically, the refactoring engine 122 may use the selected security solution to replace the program code portion associated with the detected security vulnerability. In one implementation, transforming the program code portion may include changing an Abstract Syntax Tree (AST) of the relevant segment of the program code and re-generating the source code segment from the AST using methods known in the art.

The above embodiment is also explained below by way of an illustration. It should be noted that the illustration is provided for sake of explanation only and should no way be considered to be a limitation on the scope of the present subject matter. In this example, when the user uses the static analysis tool 118 to detect security vulnerabilities, a vulnerable code as shown in Listing 1 is detected. The composer 120 may recognize that the vulnerable code is about an SQL Injection vulnerability, Subsequently, the IDE may propose different possible solutions i.e. the set of security solutions to the user for the SQL injection vulnerability. The set of security solutions has two available solutions and is shown in Listing 4. In the present example, the user may select one security solution from the set of security solutions. After the user selects the security solution, the code may be transformed to be as in Listing 2. A vulnerability specification and a solution specification for the SQL injection vulnerability are informally illustrated in Listings 3 and 4.

Listing 1: Vulnerable Code

```
//data from the URL. Controlled by attacker
String tainted = request.getParameter("uname");
String sql = "Select * from USERS where login = '" +tainted+"';";
conn.execute(sql);
```

Listing 2: Fixed Code

```
//data from the URL. Controlled by attacker
String tainted = HttpServletRequest.getParameter("uname");
PreparedStatement stmt = conn.prepareStatement(
        "Select * from USERS where login = ?");
stmt.setString(1, tainted) stmt.executeQuery( );
```

Listing 3: Sample Vulnerability Pattern

```
Vulnerability:
//data from the URL. Controlled by attacker
String tainted = HttpServletRequest.getParameter(*);
//any method with the @StringSanitize annotation
NOT trainted = @StringSantize(trainted);
//any method with the @StringTaintCheck annotation
NOT @StringTaintCheck(tainted);
//Strings derived from tainted string handled automatically
String sql <- tainted;
Connection.execute(sql);
Solution:
@StringSanitize(tainted)
@StringTaintCheck(tainted)
UseORM
UsePrecompiledQueries(sql, ∀<--tainted)
```

Listing 4: Two Solutions for the Vulnerability Identified in Listing 3

```
Solution: @StringTaintCheck(String tainted , Object[ ] tainted)
//checks only for request splitting
+ if(tainted.indexOf(0x00) != −1
+         || tainted.indexOf(0x01) != −1)
+       throw new IllegalArgumentException( );
Solution: UsePrecompiledQueries(String sql, Object[ ] tainted)
//remove offending code
- Connection.execute(sql);
```

-continued

```
// some internal manipulations
int[ ] indexes = AST.declaration(sql).findOrders(tainted));
String newSQL = AST.declaration(sql).transform(tainted ,'?');
newSQL = newSQL.optimizeString( );
//add to source code right after offending statement
+ PreparedStatement stmt = Connection.prepareStatement(newSQL);
for (int i = 0; i < tainted.length. i++){
        + stmt.set#(tainted[i].getClass( ))(indexes[i], tainted); } +
stmt.execute( );
```

It may be understood that although, in one implementation, the user may select a security solution from the set of security solutions, in another implementation, the user may not select any security solution from the set of security solutions presented to the user. The user may instead develop or create a new solution specification specifying one or more new security solutions in order to remediate the detected security vulnerability. Specifically, the user may use the specification editor 124 within the IDE to modify the solution specifications 132 to add the new solution specification for the detected security vulnerability. More specifically, the user may use the specification editor 124 to append the new solution specification to the solution specifications 132 in the SR 128.

In the embodiment described above, the detected security vulnerability was a known security vulnerability, however, in another embodiment, the detected security vulnerability may be an unknown security vulnerability. In this embodiment, the detected security vulnerability may not be specified in the SR 128. In other words, the detected security vulnerability may not have a corresponding vulnerability specification because the detected security vulnerability was a new type of security vulnerability. Therefore, the user may again use the specification editor 124 to modify the vulnerability specifications 130 to add a new vulnerability specification for the detected security vulnerability. Specifically, the user may use the specification editor 124 to create the new vulnerability specification for the detected security vulnerability in order to append the new vulnerability specification to the vulnerability specifications 130 in the SR 128.

In the present embodiment, the user may further use the specification editor 124 to modify the solution specifications 132 to add one or more new solution specifications for the detected security vulnerability as described above. As will be appreciated by a person skilled in the art, the new security solutions can include previously available solutions that were relevant.

In this way, several users may use their respective IDEs to build the specification repository 128. Specifically, the users may modify the vulnerability specifications 130 and the solution specifications 132 to add new vulnerability specifications and new solution specifications, thereby enabling the specification repository 128 to remediate more and more security vulnerabilities. Advantageously, the specification repository 128 may evolve and keep updated as more and more users contribute to the development of the specification repository 128.

In one implementation, the set of security solutions may be presented based upon a framework used by the user to develop the program code. Specifically, a framework detector (not shown) may first detect the framework(s) used by the user. The framework detector may then send information related to the frameworks used to the composer 120. Depending upon the detected framework used by the user, the IDE may present the set of security solutions. Further, after the set of security solutions is presented to the user, the user may select a security solution based upon a relevance parameter. For example, the relevance parameter may indicate one or more frameworks used by the user, to which the solution is associated with. In another implementation, the relevance parameter may be high for a security solution which was selected the maximum number of times for solving a particular type of security vulnerability.

Figure 2:
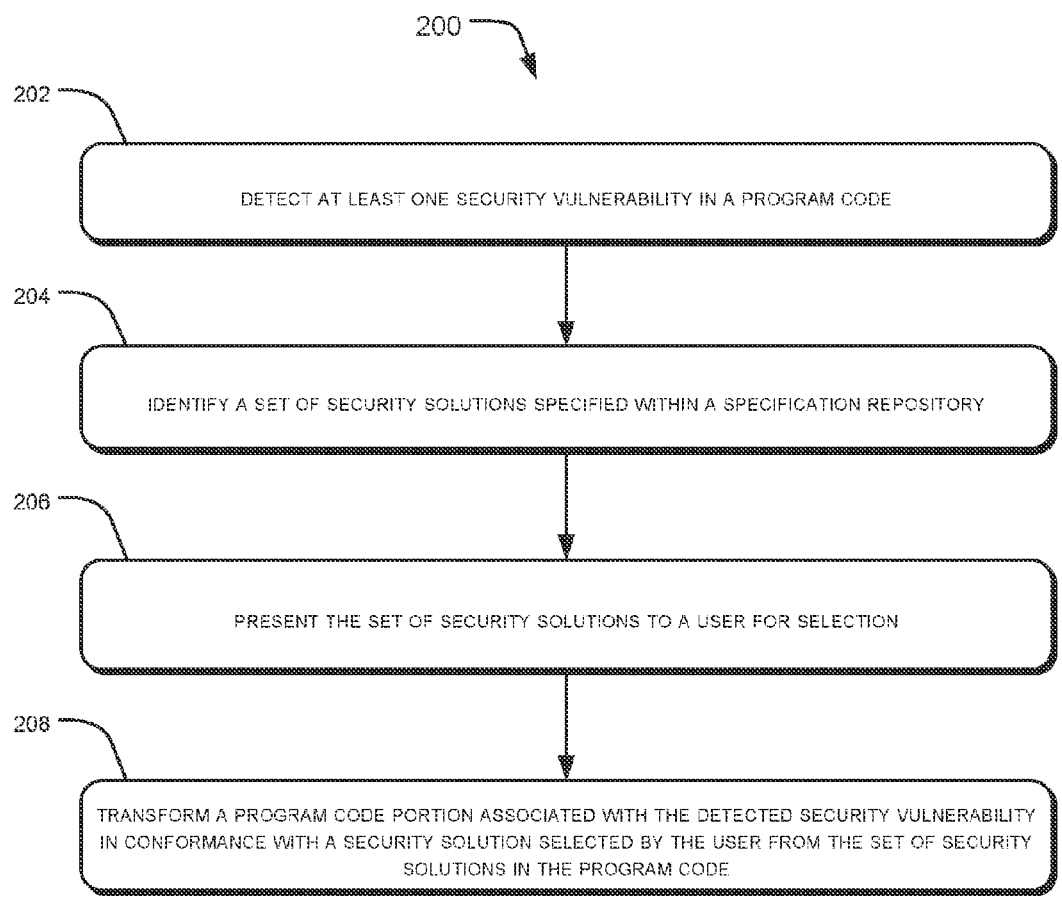
FIG. 2 illustrates a method 200 for security vulnerability correction in a program code, in accordance with an implementation of the present subject matter.

FIG. 2 illustrates a method 200 for security vulnerability correction in a program code according to an implementation of the present subject matter. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communications network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternate methods. Additionally, individual blocks may be deleted from the method 200 without departing from the spirit and scope of the subject matter described herein. Furthermore, the method can be implemented in any suitable hardware, software, firmware, or combination thereof.

At block 202, one or more security vulnerabilities may be detected in the program code. Specifically, the security vulnerability may be detected within the IDE 118 during a scanning of the program code for security vulnerabilities. The scanning may be performed by the static analysis tool 118 to detect the one or more security vulnerabilities in the program code.

At block 204, a set of security solutions specified within the specification repository may be identified. Specifically, the composer 120 identifies a relevant subset from the set of security solutions specified in the specification repository. Each security solution in the set of security solutions which is specified as relevant for the given type of vulnerability is associated with the detected security vulnerability. The set of security solutions may be one or more programming constructs that can be utilized for fixing the detected security vulnerability. In one implementation, the set of security solutions may provide implementations to a list of abstract solutions mentioned in a vulnerability specification corresponding to the detected security vulnerability.

At block 206, the set of security solutions is presented to a user for selection. In one implementation, the set of security solutions can be presented through the IDE.

At block 208, the program code portion associated with the detected security vulnerability is transformed in conformance with the security solution selected by the user in block 206. Specifically, the refactoring engine 122 replaces the program code portion associated with the detected security with the security solution selected by the user.

Although implementations for methods and systems for correcting security vulnerabilities in a program code have been described in language specific to structural features and/or methods, it is to be understood that the appended claims are not necessarily limited to the specific features or methods described. Rather, the specific features and methods are disclosed as examples of implementations for correcting security vulnerabilities.

I claim:

1. A computer-implementable method for addressing security vulnerabilities in a source code using a computing system having a processor, the method comprising:
   detecting a security vulnerability, by a static analysis tool coupled to the processor, in the source code by assessing the source code against a specification repository, wherein the specification repository comprises a specification for said security vulnerability;
   presenting, by a vulnerability parser the detected security vulnerability to a user in an Integrated Development Environment (IDE);
   identifying, by a composer coupled to the processor, a set of security solutions specified within the specification repository, wherein the specification repository comprises at least one security solution associated with the detected security vulnerability;
   presenting, by the processor, the set of security solutions to a programmer in an Integrated Development Environment (IDE), wherein a security solution of the set of security solutions is selected based on a relevance parameter, wherein the relevance parameter is based at least on number of times a security solution has been used, wherein the programmer selects a security solution from the set of security solutions;
   removing a source code portion, by a refactoring engine coupled to the processor, associated with the detected security vulnerability and replacing the source code portion with the selected security solution in the Integrated Development Environment (IDE), wherein replacing the source code portion with the security solution comprises:
      generating a code portion in conformance with the security solution selected by the programmer from the set of security solutions; and
      inserting the generated code portion in place of the removed source code portion; and
   editing of the specification repository upon detection of a new vulnerability, wherein the editing comprises:
      modifying, using a specification editor coupled to the processor, the vulnerability specifications by adding the new vulnerability specification for the detected security vulnerability of the source code, wherein the new vulnerability specification is associated with the detected security vulnerability; and
      modifying, using a specification editor coupled to the processor, the solution specifications by adding a new solution specification for the detected security vulnerability of the source code, wherein the new solution specification specifies at least one new security solution for addressing the detected security vulnerability.

2. The method of claim 1, wherein the specification repository comprises vulnerability specifications and solution specifications, and wherein the vulnerability specifications specify a plurality of security vulnerabilities, and the solution specifications specify a plurality of security solutions associated with one or more of the plurality of security vulnerabilities.

3. The method of claim 2, wherein the detected security vulnerability is specified in the vulnerability specifications.

4. The method of claim 1, wherein the source code portion associated with the detected security vulnerability is transformed in an IDE.

5. A Security Vulnerability Correction System (SVCS) for addressing security vulnerabilities in a source code, the SVCS comprising:
   a processor; and
   a memory coupled to the processor, the memory comprising:
      a static analysis tool for detecting a security vulnerability in the source code, wherein the static analysis tool detects by assessing the source code against a specification repository, wherein the specification repository comprises a specification for said security vulnerability;
      a vulnerability parser for presenting the detected security vulnerability to a user in an Integrated Development Environment (IDE);
      a composer for identifying a set of security solutions specified within a specification repository, wherein each security solution is associated with the detected security vulnerability, wherein a security solution of the set of security solutions is selected based on a relevance parameter, wherein the relevance parameter is based at least on number of times a security solution has been used;
      a refactoring engine to remove a source code portion associated with the detected security vulnerability and to replace the source code portion with a security solution selected by a programmer from the set of security solutions in the Integrated Development Environment (IDE); and wherein replacing the source code portion with the security solution comprises:
         generating a code portion in conformance with the security solution selected by the programmer from the set of security solutions; and
         inserting the generated code portion in place of the removed source code portion; and
      a specification editor to edit the specification repository upon detection of a new vulnerability, wherein the editing comprises,
         modifying the vulnerability specifications by adding the new vulnerability specification for the detected security vulnerability of the source code, wherein the new vulnerability specification is associated with the detected security vulnerability; and
         modifying the solution specifications by adding a new solution specification for the detected security vulnerability of the source code, wherein the new solution specification specifies at least one new security solution for addressing the detected security vulnerability.

6. The SVCS of claim 5, wherein the specification repository comprises vulnerability specifications and solution specifications, and wherein the vulnerability specifications specify a plurality of security vulnerabilities, and the solution specifications specify a plurality of security solutions associated with one or more of the plurality of security vulnerabilities.

7. The SVCS of claim 6, wherein the detected security vulnerability is specified in the vulnerability specifications.

8. The SVCS of claim 5, wherein the refactoring engine transforms the source code portion associated with the detected security vulnerability in an Integrated Development Environment (IDE).

9. A non-transitory computer-readable medium having embodied thereon a computer program for executing a method for addressing security vulnerability in a source code, the method comprising:

detecting a security vulnerability in the source code by assessing the source code against a specification repository, wherein the specification repository comprises a specification for said security vulnerability;

presenting, by a vulnerability parser the detected security vulnerability to a user in an Integrated Development Environment (IDE);

identifying a set of security solutions specified within the specification repository, wherein each security solution is associated with the detected security vulnerability;

presenting the set of security solutions to a programmer for selection in the Integrated Development Environment (IDE), wherein a security solution of the set of security solutions is selected based on a relevance parameter, wherein the relevance parameter is based at least on number of times a security solution has been used;

removing a source code portion associated with the detected security vulnerability, and replacing the source code portion with a security solution selected by the programmer from the set of security solutions in the Integrated Development Environment (IDE); and wherein the replacing the source code portion with the security solution comprises:

generating a code portion in conformance with a security solution selected by the programmer from the set of security solutions; and inserting the generated code portion in place of the removed source code portion; and editing of the specification repository upon detection of a new vulnerability, wherein the editing comprises:

modifying, using a specification editor coupled to the processor, the vulnerability specifications by adding the new vulnerability specification for the detected security vulnerability of the source code, wherein the new vulnerability specification is associated with the detected security vulnerability; and modifying, using a specification editor coupled to the processor, the solution specifications by adding a new solution specification for the detected security vulnerability of the source code, wherein the new solution specification specifies at least one new security solution for addressing the detected security vulnerability.

10. The non-transitory computer-readable medium of claim 9, wherein the specification repository comprises vulnerability specifications and solution specifications, and wherein the vulnerability specifications specify a plurality of security vulnerabilities, and the solution specifications specify a plurality of security solutions associated with one or more of the plurality of security vulnerabilities.

11. The non-transitory computer-readable medium of claim 10, wherein the detected security vulnerability is specified in the vulnerability specifications.

12. The non-transitory computer-readable medium of claim 9, wherein the set of security solutions is presented in an Integrated Development Environment (IDE), to the programmer.

13. The non-transitory computer-readable medium of claim 9, wherein the source code portion associated with the detected security vulnerability is transformed in an IDE.

* * * * *